United States Patent Office 3,201,476
Patented Aug. 17, 1965

3,201,476
OXIDATIVE CLEAVAGE OF OLEFINIC DOUBLE BONDS
Leonard M. Baker, Plainfield, and Wayne L. Carrick, East Brunswick, N.J., assignors to Union Carbide Corporation, a corporation of New York
No Drawing. Filed Aug. 23, 1962, Ser. No. 218,838
6 Claims. (Cl. 260—597)

The invention relates to a method for cleavage of olefinic double bonds. More particularly, the invention relates to a method whereby olefinic double bonds are selectively oxidatively cleaved to corresponding primary oxidation products through the action of a supported chromium trioxide catalyst.

Oxidative cleavage of olefinic double bonds is an important reaction in both the synthesis and analysis of organic compounds. By the fission of olefinic double bonds through oxidation two new compounds, oxidation products of the olefin, can be produced. These compounds can be isolated and used as such if their structure is known, or isolated and identified as part of a structure proof of the parent compound.

The importance of the oxidative cleavage reaction of olefins in synthetic and analytical work is emphasized by the large number of methods which have been employed in the past to effect cleavage. For example, oxidation with an alkaline solution of potassium permanganate has been commonly used. This method requires that the permanganate oxidation be exhaustive since a glycol first forms which must be cleaved. The permanganate method is subject to limitation, however, because it is not selective. Substituent groups on the unsaturated compound can also be oxidized, and the primary oxidation products, i.e., those products formed after fission of the double bond, often are further oxidized. Aldehydes, for example, are oxidized further to acids, and, in the case of formaldehyde, to carbon dioxide and water. As are most of the cleavage methods now known, this method is associated with difficult, time-consuming, work-up procedures.

Other methods are known whereby oxidative cleavage can be effected by multiple step reactions usually involving conversion of the double bond to a 1,2-glycol followed by oxidative cleavage of the glycol. Oxidation with organic peracids, such as peracetic acid, leads to the formation of epoxides which can be hydrolyzed to glycols. Hydrogen peroxide in formic acid produces the corresponding hydroxyformate which, after hydrolysis, also converts olefins to glycols. Both of these methods suffer from a lack of specificity and from side reactions which greatly reduce the yield of glycol.

Another method of hydroxylation of carbon-carbon double bonds is oxidation with osmium tetroxide. An osmic ester is formed which, upon hydrolysis, affords a 1,2-glycol. Because of the expense and toxicity of the reagent, however, the procedure is used only in the synthesis of fine chemicals, such as phramaceuticals, and for small-scale degradative studies.

The 1,2-glycols prepared by any of the above methods can be cleaved to carbonyl derivatives with lead tetraacetate or periodic acid in a separate step following isolation and purification of the glycol.

Chromic anhydride in a number of solvents and solvent mixtures, such as chromic anhydride in acetic acid, has also been used for oxidative cleavage of carbon- carbon double bonds. This method, however, usually leads to a complex mixture of primary and secondary oxidation products as well as a number of other undesired compounds formed via rearrangement and elimination reactions.

Cleavage of carbon-carbon double bonds by ozonolysis is another much used degradative procedure. Ozone, produced in amounts up to about 8 percent by passing a stream of oxygen through a generator in which it is submitted to an electric discharge, adds to the double bond to give a cyclic peroxide, or ozonide. The ozonides are seldom isolated or purified since they are usually viscous oils or gases, and most are highly explosive. The ozonides can be decomposed under oxidative conditions, e.g. with permanganate, to produce carboxylic acids. Hydrolytic decomposition of the ozonide affords aldehydes and/or ketones as well as hydroperoxides and/or peroxides derived from subsequent oxidation of the initial products by hydrogen peroxide produced in the reaction or as direct products of hydrolysis or rearrangement of the ozonide.

From the above discussion of the most commonly used oxidative cleavage methods, it can be seen that a highly selective, conveniently employed, inexpensive method for the oxidative cleavage of carbon-carbon double bonds is lacking in the art. It is an object of this invention to provide such a method of oxidative cleavage which can be carried out under mild conditions and which affords only primary oxidation products.

It is another object of this invention to provide a method for oxidative cleavage of olefinic double bonds wherein the catalyst can be regenerated and reused any number of times.

A method has now been discovered for the cleavage of olefinic double bonds to corresponding carbonyl derivatives which comprises contacting a compound having at least one olefinic double bond with an activated catalyst comprising hexavalent chromium trioxide adsorbed onto a support, which can be silica, alumina, silica-alumina mixtures, zirconia, or thoria, under a water-free atmosphere.

The use of hexavalent chromium trioxide ($CrO_3$), impregnated on one of the above-mentioned supports, offers a convenient, inexpensive, one-step method for oxidative cleavage of carbon-carbon double bonds which exhibits a degree of specificity heretofore unattainable in the art.

By the method of this invention, a desired amount of hexavalent chromium trioxide is first adsorbed on the support. The catalyst is activated as hereinafter described and a desired amount then slurried under a water-free atmosphere such as nitrogen, dry air, noble gas, and the like, either alone with the olefin to be oxidized or in a non-aqueous, non-polar hydrocarbon solvent which is susbtantially free of water, i.e., contains less than about 100 parts water per million parts hydrocarbon solvent. If a hydrocarbon solvent is used, the compound containing the carbon-carbon double bond, or a solution thereof, is slowly added to this mixture maintained under a water-free atmosphere. When the compound is added in a solution, it is preferable to use the same solvent as the solvent in which the supported catalyst is mixed. The reaction mixture is allowed to stand until reaction is essentially complete. Water is then added to the mixture to desorb the oxidized fragments. The oxidized materials can easily be recovered from solution by any of several standard techniques well known to the art, such as fractional distillation, recrystallization, and the like. The chromium trioxide, which is reduced during the oxidative cleavage, can be mechanically separated and oxidized to the hexavalent state for reuse if desired.

Compounds which can be oxidatively cleaved to corresponding carbonyl derivatives, i.e., aldehydes, or ketones, by the process of this invention are those olefins having the general formula:

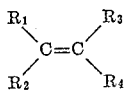

wherein $R_1$, $R_2$, $R_3$, and $R_4$, which can be the same or different, can be hydrogen, a substituted or unsubstituted alkyl group, a substituted or unsubstituted aryl group, or an unsaturated alkyl group having from one to a plurality of carbon-carbon double bonds.

Activation of the supported catalyst is accomplished by removing water which is physically bound to the support. Thus any method which essentially frees the support of water is effective and can be employed. Methods of activation which have been found to be suitable and which are preferred for ease of operation are heating the supported catalyst in a stream of dry air for from about 1 to 10 hours at a temperature in the range of 450 to 600° C., subjecting the supported catalyst to vacuum at a temperature of about 20 to about 100° C. for from about 6 to about 48 hours, and heating the supported catalyst in air at 100° C. for about 6 to about 48 hours.

When activation temperatures greater than about 200° C. are used it is necessary to employ an oxidizing atmosphere such as dry air or oxygen since chromium trioxide is susceptible to thermal reduction at these temperatures.

It is preferred, but not essential, that a hydrocarbon solvent be used in the reaction. The oxidation is also effectively conducted in the absence of a solvent, but when large amounts of the supported catalyst are added to an olefin there can be a problem in stirring and in workup.

The hydrocarbon solvent in which the oxidation reaction is conducted is preferably a normally liquid aliphatic, cycloaliphatic or mononuclear aromatic hydrocarbon containing from 5 to about 10 carbon atoms. Examples of such hydrocarbons include pentane, hexane, octane, cyclopentane, cyclohexane, benzene, toluene, and the like.

The length of time the reaction is allowed to proceed is determined by the amount of chromium trioxide adsorbed on the support and by the concentration of the supported catalyst in the reaction mixture. It is normally convenient to adsorb from about 1 to about 6 percent by weight chromium trioxide on the support material. The exact amount adsorbed is not particularly critical. Any amount of the supported catalyst can be added to the hydrocarbon solvent-olefin mixture. If quantitative conversion of olefin to primary oxidation products is desired, at least a molar equivalent of chromium trioxide, adsorbed on the support, is added. If incomplete oxidation is desired, less than a molar equivalent of chromium trioxide is added. In either case no products other than the primary oxidation products of the olefin are produced. The oxidation is a function of stoichiometry and not rate of reaction and ordinarily the reaction is completed within a relatively short period of time, ordinarily less than a few hours, and often in a matter of minutes. The reaction mixture can be refluxed if desired but this step is not essential.

It is important to note that the supported catalyst can be isolated after use and reactivated by heating in an oxidizing atmosphere. Thus the catalyst can be continuously regenerated after use and can be employed for an indefinite number of cleavages. Regeneration of the catalyst, coupled with the fact that the materials which comprise the catalyst are already inexpensive, eliminates from consideration the normally important cost factor in large-scale oxidations. This method could also be readily adapted to a continuous process whereby the olefin to be cleaved is passed over the supported catalyst in the presence of air, oxygen or other suitable oxidizing agent, thus continuously regenerating the catalyst as it is reduced by reaction with the unsaturated linkage.

The following examples illustrate the invention and are not to be construed as limitative thereof. In all examples the reaction was conducted under a substantially water-free atmosphere.

Example 1

Chromium trioxide was dissolved in water and a support comprising 88 percent by weight silica and 12 percent by weight alumina was added to the solution in an amount such that 5 percent by weight chromium trioxide was impregnated thereon. The chromium trioxide oxidative catalyst on the silica-alumina support was activated by heating it in a stream of air at 550° C. for six hours prior to use. A solution containing 2.02 grams of trans-stilbene dissolved in 75 milliliters of anhydrous cyclohexane was added to 23.4 grams of the cooled supported catalyst. The mixture was kept at room temperature under an atmosphere of nitrogen for one hour. After this time the reaction mixture was triturated with 15 milliliters of water and the cyclohexane layer was withdrawn and dried over magnesium sulfate. Infared spectrophotometric analysis of the cyclohexane solution showed that 10 percent by weight of the trans-stilbene had reacted. Of the trans-stilbene which reacted, benzaldehyde was the only reaction product. It should be noted that benzaldehyde is readily oxidized to benzoic acid under the conditions of most oxidative cleavage methods.

Example 2

The procedure of Example 1 was followed except that 0.075 gram of trans-stilbene and 12 grams of the supported oxidative catalyst were used. Complete conversion of the trans-stilbene to benzaldehyde, without the formation of any side products, was effected.

Example 3

The catalyst used in this example was 5 percent by weight chromium trioxide impregnated on an 80 to 200 mesh adsorption alumina. Activation was effected by maintaining the oxidation catalyst material under vacuum in a rotary evaporator at room temperature for 18 hours prior to use. To 25 grams of the activated oxidative catalyst was slowly added a solution containing 2.1 grams of trans-stilbene dissolved in 80 milliliters of anhydrous cyclohexane. Upon addition of the trans-stilbene solution an exotherm was produced and the mixture was shaken vigorously for several minutes. The reaction mixture was then triturated with 75 milliliters of water and the cyclohexane solution removed and dried over magnesium sulfate. The infrared spectrum showed that 16.3 weight percent of the trans-stilbene had been converted to benzaldehyde. The remainder of the solution was unreacted trans-stilbene only.

Example 4

A portion of the unactivated oxidative catalyst prepared for use in Example 3 was activated by heating in air at 550° C. for six hours. To 45.0 grams of this oxidative catalyst was added, under nitrogen, a solution containing 3.8 grams of trans-stilbene in 144 milliliters of cyclohexane. After several minutes at room temperature the reaction mixture was triturated and the cyclohexane solution dried as in Example 3. Under these conditions, 6 percent by weight of the trans-stilbene was converted to benzaldehyde and there were no side products.

Example 5

The oxidative catalyst used in this example was 5 percent by weight chromium trioxide impregnated on a silica support. The oxidative catalyst was activated by heating in a stream of air for 6 hours at 550° C. A solution containing 2.1 grams of trans-stilbene in 80 milliliters of cyclohexane was added to 25.0 grams of the supported catalyst. After shaking for several minutes at room temperature 50 milliliters of water was added and the mixture was again shaken. The cyclohexane layer was removed and dried over magnesium sulfate. Analysis showed the presence of only unreacted trans-stilbene and benzaldehyde. Eighteen percent by weight trans-stilbene was converted to benzaldehyde under these conditions.

*Example 6*

A portion of the unactivated oxidative catalyst prepared for use in Example 5 was activated by maintaining it under vacuum in a rotary evaporatory for 48 hours. After treatment of the oxidative catalyst with trans-stilbene and workup in accordance with the procedure described in Example 5, the conversion of trans-stilbene to benzaldehyde was 14.5 weight percent. No products other than benzaldehyde and trans-stilbene were detected in the reaction mixture.

*Example 7*

A portion of the unactivated oxidative catalyst prepared for use in Example 5 was activated by heating in air at 100° C. for one hour. After treatment of the catalyst with trans-stilbene and workup in accordance with the procedure described in Example 5, the conversion of the trans-stilbene to benzaldehyde was 6 percent by weight. No products other than benzaldehyde and trans-stilbene were detected in the reaction mixture.

*Example 8*

A portion of the oxidative catalyst prepared for use in Example 1 was activated in accordance with the procedure given in Example 1. A solution containing 1.04 grams of styrene in 50 milliliters of anhydrous cyclohexane was added dropwise to 21.2 grams of the oxidative catalyst. After allowing the mixture to stand at room temperature for several hours, 32 milliliters of water was added to the reaction mixture with shaking. The cyclohexane layer was removed and dried over magnesium sulfate. Analysis showed that 10 percent by weight of the styrene had been converted to benzaldehyde.

*Example 9*

A portion of the oxidative catalyst prepared for use in Example 1 was activated according to the procedure given in Example 1. A solution containing 0.53 gram of tetramethylethylene dissolved in 50 milliliters of cyclohexane was added slowly to 25.0 grams of the oxidative catalyst. After several minutes at room temperature, 50 milliliters of water was added with shaking and the cyclohexane layer was separated and dried over magnesium sulfate. Acetone and unreacted tetramethylethylene were the only detectable products.

*Example 10*

A portion of the oxidative catalyst prepared for use in Example 1 was activated in accordance with the procedure described in Example 1. A solution containing 0.69 gram of vinylcyclohexene dissolved in 50 milliliters of cyclohexane was added with stirring to 25.0 grams of the oxidative catalyst. After several minutes at room temperature 50 milliliters of water was added to the reaction mixture and the cyclohexane layer was separated and dried over magnesium sulfate. Analysis showed the presence of only cyclohexylaldehyde and vinylcyclohexene in the hydrocarbon phase and formaldehyde in the aqueous phase.

*Example 11*

A portion of the oxidative catalyst prepared for use in Example 5 was activated in accordance with the procedure described in Example 5. A solution containing 0.51 gram of cyclohexene in 60 milliliters of cyclohexane was added slowly to 25 grams of the oxidative catalyst. The mixture was heated to reflux for two hours, triturated with 50 milliliters of water, and the cyclohexane layer separated and dried over magnesium sulfate. Analysis of the cyclohexane solution showed the presence of unreacted cyclohexene and adipaldehyde.

What is claimed is:

1. Method for oxidative cleavage of olefinic double bonds which comprises contacting a hydrocarbon having an olefinic double bond with a hexavalent chromium trioxide adsorbed onto a water-free support selected from the group consisting of alumina, silica, mixtures of alumina and silica, thoria, and zirconia, the reaction being carried out in a liquid hydrocarbon phase free of water whereby oxidation takes place solely at the carbon atoms which were olefinically bonded forming only primary oxidation products.

2. Method as claimed in claim 1 wherein from about 1 to about 6 percent by weight of hexavalent chromium trioxide is adsorbed on said supports.

3. Method as claimed in claim 1 wherein said hydrocarbon having an olefinic double bond is trans-stilbene.

4. Method as claimed in claim 1 wherein said hydrocarbon having an olefinic double bond is styrene.

5. Method as claimed in claim 1 wherein said hydrocarbon having an olefinic double bond is tetramethylethylene.

6. Method as claimed in claim 1 wherein said hydrocarbon having an olefinic double bond is cyclohexene.

References Cited by the Examiner

Adams et al.: Organic Reactions, vol. 5, 1944, pages 331–349.

Hickinbottom et al.: Jour. Chem. Soc., 1948, pages 1334–37.

Nature, 168, 1951, pages 33–34.

LEON ZITVER, *Primary Examiner.*